UNITED STATES PATENT OFFICE.

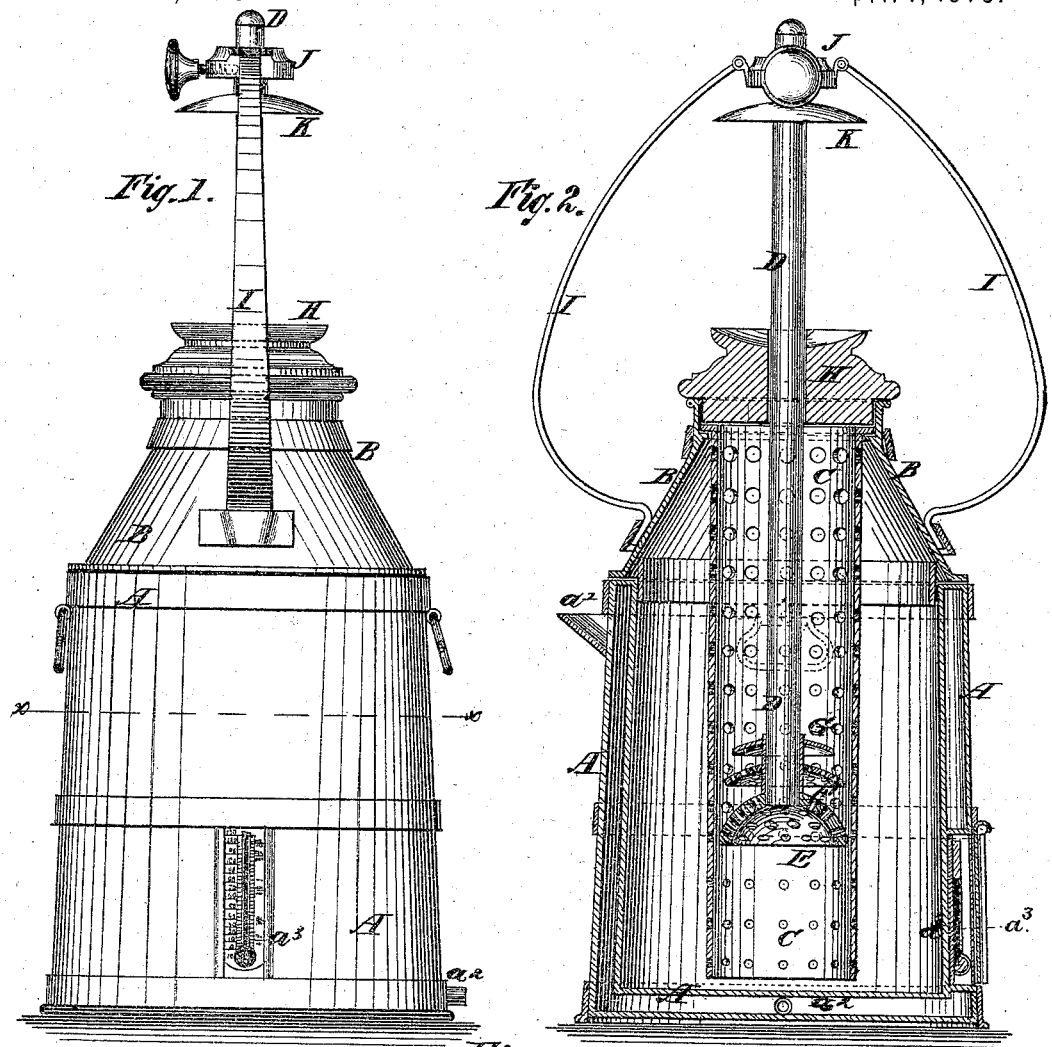

HENRY A. HINCHEER, OF HUSTONVILLE, KENTUCKY.

IMPROVEMENT IN CHURNS.

Specification forming part of Letters Patent No. 137,369, dated April 1, 1873; application filed July 27, 1872.

*To all whom it may concern:*

Be it known that I, HENRY A. HINCHEER, of Hustonville, in the county of Lincoln and State of Kentucky, have invented a new and useful Improvement in Churning Apparatus, of which the following is a specification:

In the accompanying drawing, Figure 1 is a side view of my improved churning apparatus. Fig. 2 is a detail vertical section of the same. Fig. 3 is a detail horizontal section of the same taken through the line $x$ $x$, Fig. 1.

Similar letters of reference indicate corresponding parts.

My invention has for its object to furnish an improved churning apparatus which shall be simple in construction, convenient in use, and effective in operation, requiring but a comparatively small outlay of power to operate it, and bringing the butter in a very short time; and it consists in the construction and combination of various parts of the apparatus, as hereinafter more fully described.

A represents the body of the churn, the walls of the sides and bottom of which are made double, as shown in Figs. 2 and 3, to allow cold or hot water to be poured in, to enable the temperature of the milk to be brought to the proper point. In the outer wall of the churn-body A, near its upper end, is formed a hole or holes, provided with a spout, $a^1$, for convenience in pouring in the hot or cold water. In the lower part of the body A is inserted a short pipe, $a^2$, for drawing off said water, and which should be provided with a stop-cock. In the space between the double walls of the churn-body A is formed a small compartment, in which is placed a thermometer, $a^3$, to indicate the temperature of the contents of the churn-body, and which may be inspected through an opening in the outer wall of said churn-body, which opening is closed with a slide, as shown in Figs. 2 and 3. In the upper end of the body A is fitted a cover, B, made in the form of a section of a cone, in the upper end of which is formed a narrow shoulder, upon which rests the flange formed upon the upper end of the hollow cylinder C, which extends down to or nearly to the bottom of the churn-body A. The sides of the hollow cylinder C have numerous holes formed through them, which may be round, diamond-shaped, or of other desired form. D is the dasher-handle, which passes down through the center of the perforated hollow cylinder C, and to its lower end is attached the dasher, which consists of three parts, E F G. The lower part E is made in the form of an inverted cup, having numerous holes formed through it. A little above the cup E is placed a disk, F, concave upon its lower side and convex upon its upper side. The disk F may be of a little less diameter than the part E, and is perforated with numerous holes. A little above the disk F is placed another similar disk, G, but a little smaller than the disk F, and without perforations. The top or mouth of the conical cover B is provided with a cover, H, through the center of which the dasher-handle D moves up and down, and the upper side of which is concaved to catch any milk or fine butter that may be brought up by said dasher-handle, and allow it to pass back into the churn. I are springs, one, two, or more of which may be used, and the lower ends of which are connected with the sides of the conical cover B by keepers or by other convenient means. The other ends of the springs I are attached to a collar, J, placed upon the upper end of the dasher-handle D, and secured to it by a set-screw or other convenient means, so that the collar J may be conveniently moved up and down to regulate the tension of the springs I, as required. To the lower part of the collar J, or to the dasher-handle D, is attached a disk, K, which I prefer to make concave upon its lower side, and which is designed to scare away the flies that might otherwise collect about the churn.

The mode of operation is as follows: As the dasher moves down and expresses the cream through cylinder C at the side perforations, which are below the dasher and at the open and raised end of said cylinder, the vacuum created above the piston is filled by the ingress of cream from upper part of churn. The strokes of dasher following one another in quick succession, a circulation of the cream in currents, in and out of cylinder C, is produced and continuously maintained until the butter "comes."

Having thus described my invention, I claim as new and desire to secure by Letters Patent—

The conical cover B, perforated cylinder C, dasher D E F G, and cover H, in combination with each other, to adapt them for attachment to a churn-body, substantially as herein shown and described, and for the purpose set forth.

HENRY A. HINCHEER.

Witnesses:
JOHN A. WILLIAMS,
JNO. W. HOCKER.